Figure 1:
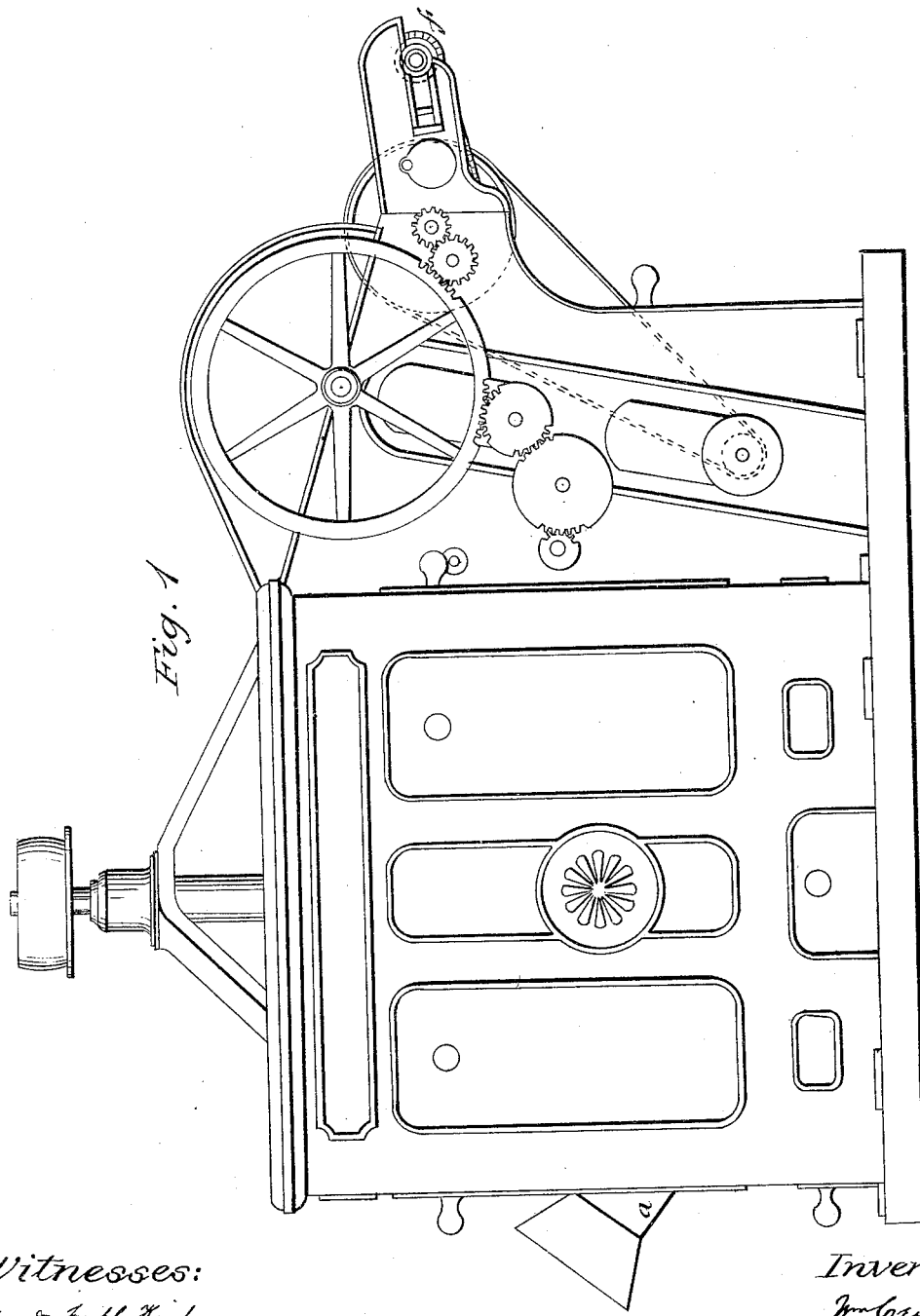

W. & F. W. CRIGHTON.
Cotton Picker.

No. 61,322.

2 Sheets—Sheet 1.

Patented Jan. 22, 1867.

Witnesses:
Edward Joseph Hughes
Septimus Hughes

Inventors:
Wm Crighton
F W Crighton

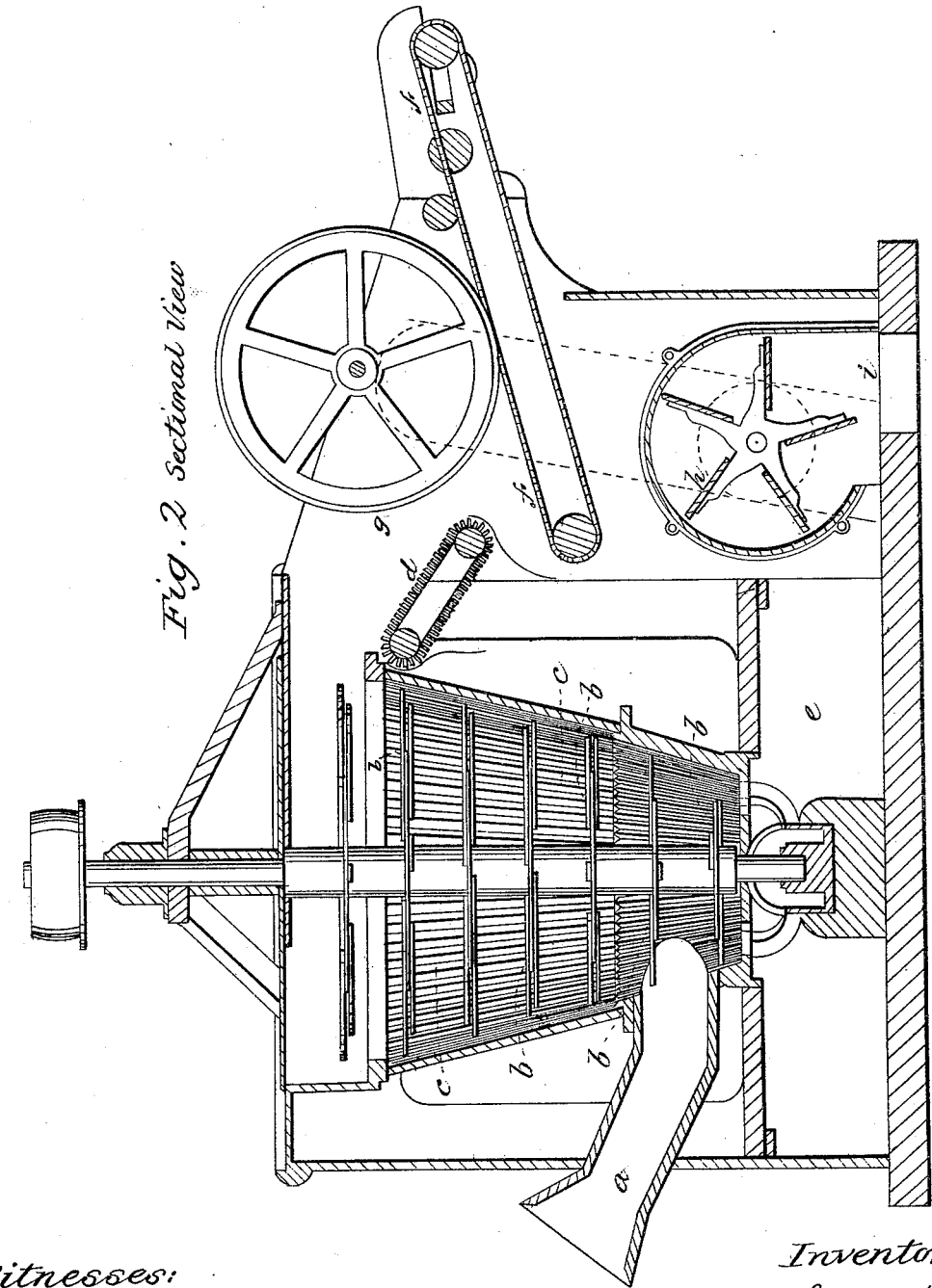

United States Patent Office.

WILLIAM CRIGHTON AND FREDERICK W. CRIGHTON, OF MANCHESTER, ENGLAND.

Letters Patent No. 61,322, dated January 22, 1867. Patented in England, April 3, 1861.

IMPROVEMENT IN MACHINE FOR PREPARING COTTON, &c.

*The Schedule referred to in these Letters Patent and making part of the same.*

TO ALL WHOM IT MAY CONCERN:

Be it known that we, WILLIAM CRIGHTON and FREDERICK WILLIAM CRIGHTON, of the city of Manchester, in the county of Lancaster, England, machinists, have invented new and useful "Improvements in Machinery or Apparatus for Preparing Cotton and other Fibrous Materials to be spun;" and we do hereby declare that the following is a full and exact description thereof, reference being had to the accompanying sheet of drawings, and to the letters marked thereon; that is to say—

In a vertical cage or grid we place a vertical beater, with arms or teeth of any suitable form fixed thereto, the said beater being conical when desired, similar to that employed in Hardacre's opener. In that opener the cotton or material is fed at the top of the machine, and in its passage downward the dirt or refuse is expelled through the cage or grid and is liable to mix with the fibrous material. In order to overcome this imperfection we cause the cotton or material to be carried upward by feeding it at the bottom or other convenient part of the beater, except the top, either through a hopper, feed-rollers, or by means of a creeper or travelling grid, the dirt or refuse being driven by the centrifugal force of the beater through the bars of the cage or grid, and as the cotton or material passes upward and the dirt downward, they are more effectually separated than in Hardacre's opener. We also employ a series of travelling grids or dirt boxes of any suitable form between the delivery part of the beater and the dust cage, and the dust is drawn off from the cage by a fan in the usual manner. In the drawings—

Figure 1 is a longitudinal elevation; and

Figure 2, a longitudinal section of one of our improved openers for preparing cotton and other fibrous materials.

$a$ represents the feed-pipe, $b$ the beater, $c$ the cage or grid through which the dirt is expelled from the fibre in its transit upward, $d$ the travelling grids or dirt boxes, $e$ the receptacle for the droppings, $f$ the delivery creeper, $g$ the dust cage, $h$ the fan, and $i$ its outlet.

When desired we place two or more cages or grids and beaters in one machine and cause the cotton or material after it has arrived at the top of the first beater to be conveyed to the next beater, and so on if more than two beaters are employed, but when required any one beater only of the compound machine may be employed. Or we make a machine compounded of several beaters, and use one or more at a time according to the conditions required. A lap machine may be applied to the opener if desired. The use of the travelling grids or dirt boxes is not confined to openers, as they may be applied with advantage to other preparing machines, such as scutchers, blowers, lap machines, and carding engines.

This invention gives important advantages over and above those possessed by the invention described in the specification of the English patent of Samuel Hardacre, dated July 10, 1856. Among other things it will be observed that in our invention the cones or cases in which the openers or beaters are placed are vertical instead of horizontal, (said beaters or openers being hung on a vertical instead of a horizontal axis,) and that the cotton to be cleaned is fed in at the bottom of the cone or case, or at least at a point below where the cleaned cotton is discharged. By this arrangement most of the dirt, including the heavier particles, are caused to fall by their own weight and be discharged at a lower point than the cotton, either through interstices or through an opening at the bottom of the case; while the lighter portions are delivered into travelling dirt boxes, so constructed and arranged with reference to other parts, that the dirt which rises to the top of the beater case will be delivered separately from the cotton.

We claim—

1. The arrangement hereinbefore described, consisting of placing the beaters or openers on a vertical axis, and forming the place or opening for the delivery of the cotton at the top of said case, or at a point higher than that at which the cotton is fed into the machine, said machine being also constructed and its parts so arranged that a considerable portion of the dirt will be delivered either at the bottom of the beater case or cone, or through openings at a lower point than that at which the prepared cotton is delivered, substantially as hereinbefore set forth.

2. The combination with a beater case and beaters or other similar apparatus for cleaning cotton, of the carrier or series of dirt boxes $d$, substantially as hereinabove set forth.

Done at Manchester, England, this fourteenth day of June 1866.

WM. CRIGHTON,
F. W. CRIGHTON.

Witnesses to the signatures of the said WILLIAM CRIGHTON and FREDERICK WILLIAM CRIGHTON:
EDWARD JOSEPH HUGHES, Patent Agent, 20 Cross Street, Manchester.
G. SEPTIMUS HUGHES, Patent Agent, 20 Cross Street, Manchester.